United States Patent [19]

Shinyagaito et al.

[11] Patent Number: 4,707,733
[45] Date of Patent: Nov. 17, 1987

[54] INFORMATION SIGNAL RECORDING DISC COMPRISING A CONNECTED REGION FORMED BETWEEN PARALLEL PROGRAM RECORDED AND SINGLE PROGRAM RECORDED REGIONS, AND REPRODUCING APPARATUS THEREFOR

[75] Inventors: Tatsuya Shinyagaito; Terumasa Kuramoto, both of Iwai; Toyotaka Machida; Kikuji Saito, both of Kashiwa; Shunichi Shichijo, Sagamihara; Tooru Yamagishi, Tokyo; Kazuyoshi Ishii, Sagamihara; Yoshinao Kobayashi, Machida; Atsumi Hirata, Fujisawa, all of Japan

[73] Assignee: Victor Company of Japan, Ltd., Yokohama, Japan

[21] Appl. No.: 715,499

[22] Filed: Mar. 25, 1985

[30] Foreign Application Priority Data

Mar. 26, 1984 [JP] Japan .................................. 59-58642

[51] Int. Cl.⁴ ............................................. H04N 5/76
[52] U.S. Cl. ..................................... 358/342; 358/342; 358/907; 360/11.1; 369/32
[58] Field of Search ....................... 358/335, 342, 907; 360/11.1, 72.1, 72.2; 369/50, 32, 43, 44, 41, 47

[56] References Cited

U.S. PATENT DOCUMENTS

| | | | |
|---|---|---|---|
| 4,510,531 | 4/1985 | Sugiyama | 358/907 X |
| 4,536,863 | 8/1985 | Giddings | 369/32 X |
| 4,561,026 | 12/1985 | Abe et al. | 358/907 X |
| 4,580,253 | 4/1986 | Yoshidome | 358/907 X |

FOREIGN PATENT DOCUMENTS

| | | |
|---|---|---|
| A-3226389 | 2/1983 | Fed. Rep. of Germany . |
| WO84/A-04466 | 11/1984 | PCT Int'l Appl. . |
| A-2140963 | 12/1984 | United Kingdom . |
| A-2140958 | 12/1984 | United Kingdom . |

Primary Examiner—Robert L. Richardson
Attorney, Agent, or Firm—Michael N. Meller

[57] ABSTRACT

An information recording disc has a connecting region formed between a parallel program recorded region containing a plurality of parallel information programs and a single program recorded region containing a single information program which is to be reproduced after one of the parallel information programs is reproduced. Each of the parallel program recorded region and the connecting region includes track turns having vertical blanking parts recorded with vertical blanking periods of video signals, and at least one of the vertical blanking parts in each track turn is recorded with an address signal including a first code indicating whether an information program recorded in a track turn of a region is a single information program or a parallel information program, a second code indicating whether the region is the parallel program recorded region or the connecting region, a fourth code indicating the number of information programs recorded in the region, and a fifth code indicating the program number of the program recorded in the region. A reproducing apparatus includes a reproducing element for reproducing information signals from the disc, and the reproducing element is kicked within the vertical blanking part based on the value of the reproduced fourth code during a normal reproduction of a parallel information program.

5 Claims, 18 Drawing Figures

FIG.6

| REGION | N3 | N4 | N5 V1 V2 V3 V4 | N6 B3 B2 B1 B0 | N7 | K V1 V2 V3 V4 |
|---|---|---|---|---|---|---|
| 1,7. | | | | | | |
| 2 | | | 0 0 0 0 | 0 0 0 0 | 0 | 0 0 0 0 |
| 3 | B | A | 0 1 0 0 | 0 0 0 1 | 0 ~ 1 | 0 1 0 0 |
| | | | 1 0 1 0 | 0 0 1 0 | 0 ~ 2 | 1 0 1 0 |
| | | | 1 1 1 0 | 0 0 1 1 | 0 ~ 3 | 1 1 1 0 |
| | | | 0 0 0 0 | 0 1 0 0 | 0 ~ 4 | 1 1 1 1 |
| | | | 0 1 0 0 | 0 1 0 1 | 0 ~ 5 | 1 2 1 1 |
| | | | 1 0 1 0 | 0 1 1 0 | 0 ~ 6 | 2 1 2 1 |
| | | | 1 1 1 0 | 0 1 1 1 | 0 ~ 7 | 2 2 2 1 |
| 4,5 | | B | 0 0 0 0 | 1 0 0 0 | 0 ~ 8 | 2 2 2 2 |
| | | | 0 1 0 0 | 1 0 0 1 | 0 ~ 9 | 2 3 2 2 |
| | | | 1 0 1 0 | 1 0 1 0 | 0 ~ A | 3 2 3 2 |
| | | | 1 1 1 0 | 1 0 1 1 | 0 ~ B | 3 3 3 2 |
| | | | 0 0 0 0 | 1 1 0 0 | 0 ~ C | 3 3 3 3 |
| | | | 0 1 0 0 | 1 1 0 1 | 0 ~ D | 3 4 3 3 |
| | | | 1 0 1 0 | 1 1 1 0 | 0 ~ E | 4 3 4 3 |
| | | | 1 1 1 0 | 1 1 1 1 | 0 ~ F | 4 4 4 3 |
| 6 | | E | 0 0 0 0 | 0 0 0 0 | 0 | 0 0 0 0 |
| | | | 0 1 0 0 | 0 0 0 1 | 0 | 0 1 0 0 |
| | | | 1 0 1 0 | 0 0 1 0 | 0 | 1 0 1 0 |
| | | | 1 1 1 0 | 0 0 1 1 | 0 | 1 1 1 0 |
| | | | 0 0 0 0 | 0 1 0 0 | 0 | 1 1 1 1 |
| | | | 0 1 0 0 | 0 1 0 1 | 0 | 1 2 1 1 |
| | | | 1 0 1 0 | 0 1 1 0 | 0 | 2 1 2 1 |
| | | | 1 1 1 0 | 0 1 1 1 | 0 | 2 2 2 1 |
| | | | 0 0 0 0 | 1 0 0 0 | 0 | 2 2 2 2 |
| | | | 0 1 0 0 | 1 0 0 1 | 0 | 2 3 2 2 |
| | | | 1 0 1 0 | 1 0 1 0 | 0 | 3 2 3 2 |
| | | | 1 1 1 0 | 1 0 1 1 | 0 | 3 3 3 2 |
| | | | 0 0 0 0 | 1 1 0 0 | 0 | 3 3 3 3 |
| | | | 0 1 0 0 | 1 1 0 1 | 0 | 3 4 3 3 |
| | | | 1 0 1 0 | 1 1 1 0 | 0 | 4 3 4 3 |
| | | | 1 1 1 0 | 1 1 1 1 | 0 | 4 4 4 3 |

FIG.7A

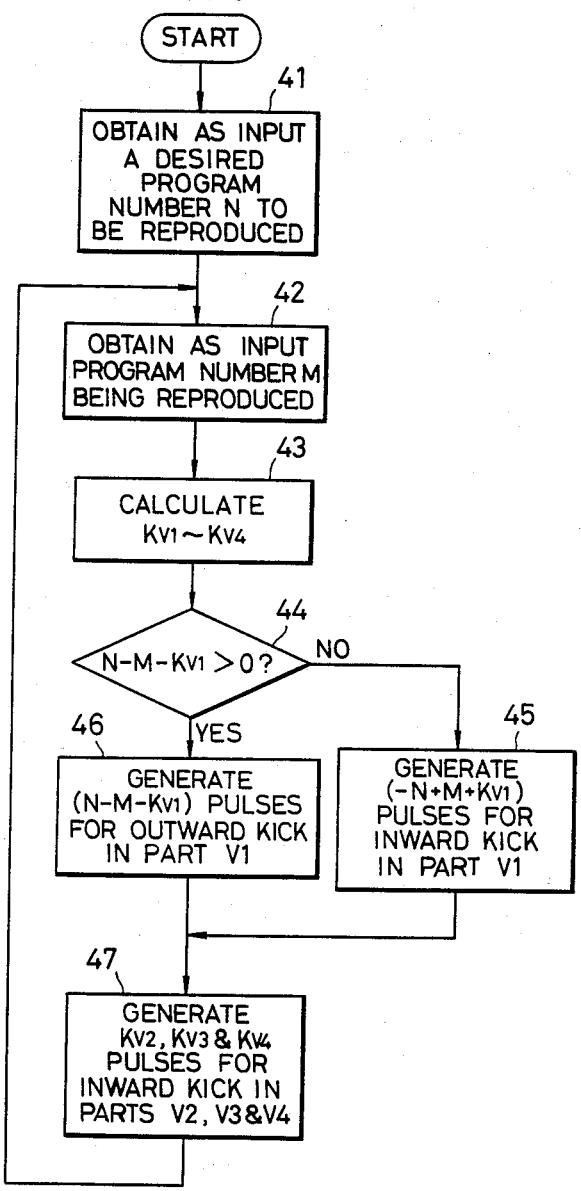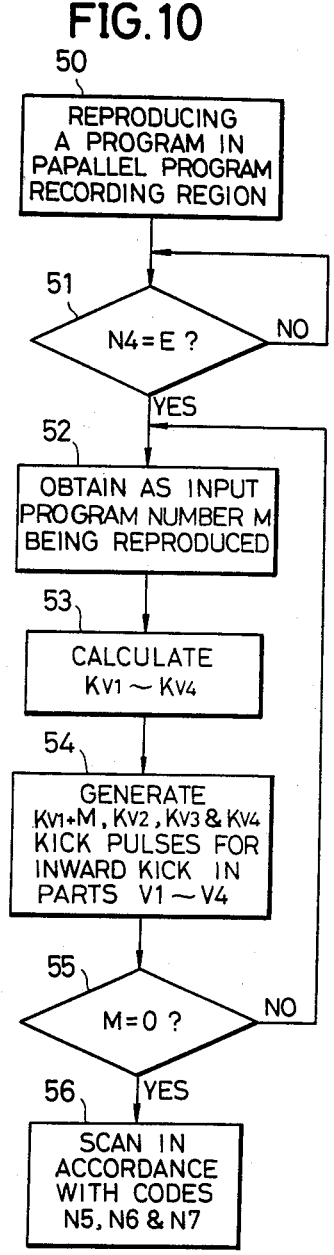

INFORMATION SIGNAL RECORDING DISC COMPRISING A CONNECTED REGION FORMED BETWEEN PARALLEL PROGRAM RECORDED AND SINGLE PROGRAM RECORDED REGIONS, AND REPRODUCING APPARATUS THEREFOR

BACKGROUND OF THE INVENTION

The present invention generally relates to information recording discs and reproducing apparatus therefor, and more particularly to an information signal recording disc which is recorded with information signals including at least video signals and related to a plurality of parallel programs, and a reproducing apparatus for reproducing the recorded information signals from the information recording disc. The information signals have mutually different information contents, and only one of the plurality of parallel programs is selectively reproduced in a given reproducing time period. The information signals are switched in terms of a plurality of fields recorded in one track turn of the information recording disc or in terms of a number of fields smaller than the number of fields recorded in one track turn of the information recording disc, and are time-sequentially recorded on the information recording disc together with predetermined codes. In the present specification, those programs only one of which is reproduced in a given reproducing time period, are referred to as parallel programs.

Information recording discs such as video discs are put into various use. The information recording disc may be recorded with a plurality of programs so that only one of the plurality of programs is selectively reproduced in a given reproducing time period. In a case where the information recording disc is used for a simulation game of golf or automobile racing, for example, it is necessary to selectively reproduce one of a plurality of recorded programs related to a plurality of possible results as the game progresses, depending on the speed and direction of the golf swing, the direction of the wind and the like in the case of the golf game, or depending on the manner in which the driver operates the steering wheel, the accelerator, the brake and the like in the case of the automobile racing game. In such a case, the plurality of programs related to the plurality of possible results or possible processes are recorded on a conventional information recording disc in independent blocks, and an arbitrary program is selectively reproduced by making a random access search to a corresponding block. However, it takes a time in the order of at least one second to complete the random access search, and there is a disadvantage in that the player (operator) will lose interest in the game when it takes such a long time for the game apparatus to react to a manipulation made by the player's.

Accordingly, an information recording disc in which the above described disadvantages are overcome, was previously proposed in a U.S. patent application Ser. No. 523,668 filed Aug. 15, 1983 in which the assignee is the same as the assignee of the present application. According to this previously proposed information recording disc, information signals at least including video signals are recorded at a rate of a plurality of fields in one track turn of the information recording disc. The information signals related to a plurality of parallel programs are switched in terms of the plurality of fields recorded in one track turn on in terms of a number of fields smaller than the number of fields recorded in one track turn, and are time-sequentially recorded on the information recording disc. When continuously reproducing an arbitrary program from the information recording disc, it is possible to obtain a normal reproduction picture and normal reproduction audio signals by forcibly shifting (hereinafter referred to as kicking) a reproducing element in a track width direction. In addition, it is possible to instantaneously change to a different program so as to obtain a normal reproduction picture and normal reproduction audio signals of this different program, by not carrying out the kick. Therefore, the previously proposed information recording disc is advantageous in that the recorded information signals related to the plurality of parallel programs are reproduced in real-time, and it is possible to prevent the player from losing interest in the game due to slow reaction of the game apparatus.

However, in the previously proposed information recording disc, a program which is being reproduced is changed from one program to another program by not carrying out the kick. For this reason, it is only possible to change the program which is being reproduced from one program to another program which is recorded in continuance with the one program. As a result, there is a disadvantage in that it is possible to instantaneously change the program which is being reproduced to an arbitrary program in a case where three or more parallel programs are recorded in the information recording disc.

Accordingly, a reproducing apparatus for reproducing the recorded information signals from the information recording disc was proposed in a Japanese Patent Application No. 58-137266 in which the applicant is the same as the assignee of the present application, in order to eliminate the disadvantages of the previously proposed information recording disc. The previously proposed reproducing apparatus controls a pulse generating circuit for generating pulses (kick pulses) which are used to kick the reproducing element, based on a difference between a program number which is presently being reproduced and a program number which is to be reproduced, which program numbers are assigned to each of the plurality of programs recorded on the information recording disc. According to the previously proposed reproducing apparatus, it is possible to change from one program to another program even at an arbitrary reproducing point when there are three or more parallel programs from which an arbitrary program may be reproduced. For this reason, the program which is being reproduced can be changed to another program including those parallel programs which are not recorded in continuance with the program which is being reproduced. Therefore, the program which is being reproduced can be changed to an arbitrary program out of a large number of parallel programs. Thus, in a case where the previously proposed reproducing apparatus plays an information recording disc which is used for a game, the parallel programs will be reproduced in real-time and the player will be able to make a selection out of a large number of possible selections, and the game will become more interesting for the player.

However, the plurality of parallel programs from which the arbitrary program is to be selected and reproduced, are not recorded over the entire recording surface of the information recording disc. Parallel program recorded regions in which the plurality of parallel programs are recorded and single program recorded regions in which only a single program is recorded, coexist on the information recording disc. In addition, even within one parallel program recorded region, the number of parallel programs recorded in one sector may be different from the number of parallel programs recorded in another sector. In other words, the number of parallel programs recorded in one sector of one parallel program recorded region may be different from the number of parallel programs recorded in another sector of the same parallel program recorded region, depending on the progressing state of the game and on the needs. But since the previously proposed reproducing apparatus plays the information recording disc in which the number of parallel programs and the codes within the address signal indicative of the program number are not determined according to a unified method, there is a disadvantage in that it is impossible to continuously reproduce a parallel program recorded region and a single program recorded region in an optimum state. In addition, when the number of parallel programs changes during the reproduction, there is a disadvantage in that it is impossible to carry out a continuous reproduction by instantaneously changing to a desired program. Furthermore, as the reproducing element of the previously proposed reproducing apparatus moves to the single program recorded region from the parallel program recorded region, the real-time it takes for the reproducing element to reach the single program recorded region is not constant because a scanning locus of the reproducing element differs depending on the parallel program which is selectively reproduced from among the plurality of parallel programs.

SUMMARY OF THE INVENTION

Accordingly, it is a general object of the present invention to provide a novel and useful information recording disc and reproducing apparatus therefor, in which the disadvantages described heretofore are eliminated.

Another and more specific object of the present invention is to provide an information recording disc comprising a connecting region between a parallel program recorded region and a single program recorded region, and a reproducing apparatus therefor. A plurality of predetermined codes are recorded together with information signals in the parallel program recorded region and the connecting region. According to the present invention, it is possible to selectively reproduce an arbitrary parallel program, and it is possible to smoothly change the program which is being reproduced from a parallel program within the parallel program recorded region to a subsequent single program within the single program recoded region. Further, it is possible to instantaneously change the program which is being reproduced from one parallel program to another parallel program among the plurality of parallel programs. For this reason, when the present invention is applied to a simulation game, it is possible to make the game more interesting for the player (operator) because the player may instantaneously change to one of an arbitrary number of different results or processes as the game progresses. At the same time, the utilization efficiency of the track turns on the information recording disc is improved and the signal processing required in the reproducing apparatus is simplified, since the arbitrary number of parallel programs may be recorded and reproduced similarly so that the program which is being reproduced can be changed instantaneously from one parallel program to another parallel program. In addition, as the reproducing element moves from the single program recorded region to the parallel program recorded region, the reproducing element can be controlled to reproduce a parallel program having the largest program number within the same parallel program recorded region so that the parallel program which is being reproduced may thereafter be changed to another parallel program.

Still another object of the present invention is to provide an information recording disc having the information signals switched and recorded on adjacent track turns in terms of a plurality of fields recorded in one track turn of the information recording disc, and a reproducing apparatus therefor. The connecting region comprises at least a predetermined recorded region in which the number of fields of the information signals recorded in one track turn of the information recording disc decreases toward the inner or outer periphery of the information recording disc. According to the present invention, it is possible to smoothly reproduce a single program within the single program recorded region in continuance with a parallel program within the parallel program recorded region, even when an erroneous operation of the reproducing apparatus occurs. By reproducing a program of the predetermined recorded region, the reproducing element always move to a first field of a connecting region subsequent to the predetermined recorded region regardless of which track turn the reproducing element has been scanning. As a result, the reproducing time is always constant. Therefore, the present invention enables an accurate simulation, and is useful in a case where an automatic editing is performed to edit and record on the information recording disc pre-recorded information signals obtained from master tapes, for example.

A further object of the present invention is to provide an information recording disc which is recorded with codes necessary for calculating in the reproducing apparatus the number of track pitches over which the reproducing element is to be kicked in each of a plurality of vertical blanking parts in one track turn recorded with the vertical blanking periods, when reproducing a parallel program in a normal reproduction mode, and a reproducing apparatus therefor. According to the present invention, it is possible to obtain the number of track pitches over which the reproducing element is to be kicked by reproducing the codes, without the need to provide a memory circuit for storing in advance the number of track pitches over which the reproducing element is to be kicked.

Other objects and further features of the present invention will be apparent from the following detailed description when read in conjunction with the accompanying drawings.

BRIEF DESCRIPTION OF THE DRAWINGS

FIGS. 4(A) through 4(D) show signal waveforms for explaining the signals recorded on the information recording disc according to the present invention;

FIG. 6 shows an embodiment of a recorded region of the information recording disc according to the present invention, the value of each code within the address signal, and the number of track turns skipped by a kick;

FIGS. 7A and 7B schematically show recorded information contents of each embodiment of the information recording disc according to the present invention;

FIG. 9 is a flow chart for explaining the operation of an essential part of the reproducing apparatus according to the present invention;

FIG. 10 is a flow chart for explaining the operation of another essential part of the reproducing apparatus according to the present invention;

DETAILED DESCRIPTION

The information recording disc according to the present invention is at least recorded with information signals including video signals at a rate of a plurality of fields per track turn thereof. For example, a description will be given with respect to a case where the present invention is applied to an information recording disc previously proposed in the U.S. patent application Ser. No. 523,668 described before. A recording system for the information recording disc is known, and detailed description thereof will be omitted. A luminance signal and a carrier chrominance signal are separated from an NTSC system color television signal, for example. The separated luminance signal is band-limited to an upper limit frequency of approximately 3.1 MHz, and the separated carrier chrominance signal is frequency-converted into a low frequency range so that a chrominance subcarrier frequency becomes approximately equal to 2.56 MHz. The band limited luminance signal and the frequency converted carrier chrominance signal are subjected to a band share multiplexing so as to obtain a band share multiplexed signal. On the other hand, audio signal are recorded in two channels. The audio signals of first and second channels are supplied different frequency modulators and are converted into frequency modulated (FM) audio signals by frequency-modulating carriers of 3.43 MHz and 3.73 MHz, respectively. The FM audio signals are frequency division multiplexed to the band share multiplexed signal so as to obtain a frequency division multiplexed signal.

Figure 1:
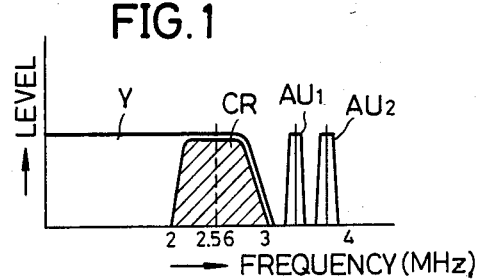
FIG. 1 shows an example of frequency spectrums of information signals recorded on the information recording disc according to the present invention.
Figure 2:
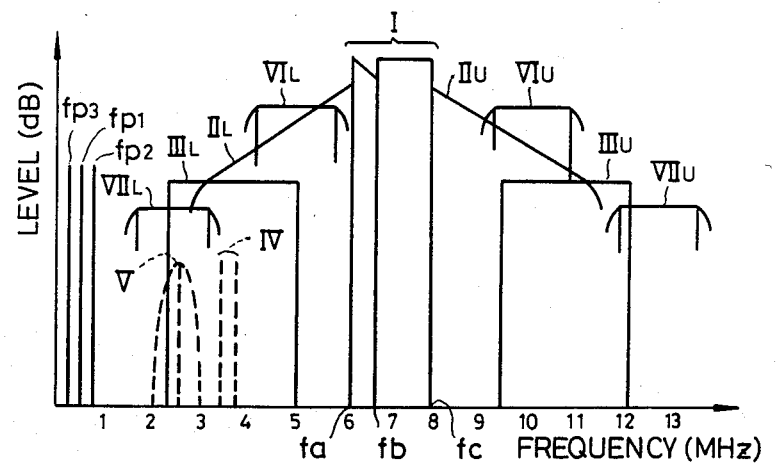
FIG. 2 shows an example of frequency spectrums of the information signals recorded on the information recording disc according to the present invention after frequency modulation.

FIG. 1 shows an example of the frequency spectrums the frequency division multiplexed signal. In FIG. 1, the frequency spectrum of the band limited luninance signal is indicated by Y, the frequency converted carrier chrominance signal is indicated by CR, and the frequency spectrums of the first and second channel FM audio signals are indicated by $AU_1$ and $AU_2$, respectively. The frequency division multiplexed signal having the frequency spectrum shown in FIG. 1 is supplied to a frequency modulator (not shown) and is formed into an FM signal having a frequency spectrum shown in FIG. 2. In FIG. 2, a carrier frequency deviation band of 2.3 MHz of the frequency modulated luminance signal is represented by I, a frequency of 6.1 MHz corresponding to a synchronizing signal tip by fa, a frequency of 6.6 MHz corresponding to a pedestal level by fb, and a frequency of 7.9 MHz corresponding to a white peak by fc. In addition, the lower and upper sidebands of the frequency modulated luminance signal are represented by $II_L$ and $II_U$, and the lower and upper sidebands of a signal which is obtained by further frequency-modulating the first and second channel FM audio signals indicated by $AU_1$ and $AU_2$ in FIG. 1 by $III_L$ and $III_U$. The carriers of the first and second channel FM audio signals having the frequencies of 3.43 MHz and 3.73 MHz, respectively, are indicated by IV.

Further, in FIG. 2, a frequency band of the frequency converted carrier chrominance signal is represented by V, which is the same as the frequency band indicated by CR in FIG. 1. In addition, first sidebands obtained when the frequency converted carrier chrominance signal is frequency-modulated are represented by $VI_L$ and $VI_U$, and second sidebands obtained when the frequency converted carrier chrominance signal is frequency-modulated by $VII_L$ and $VII_U$.

The FM audio signals having the frequency spectrum described heretofore, are obtained through an output terminal (not shown) as a main information signal.

For example, the main information signal is recorded onto a disc according to a method described in detail in a U.S. Pat. No. 4,331,976 in which the assignee is the same as the assignee of the present application. That is, for example, the main information signal is applied to a light modulator (not shown) wherein a laser light is modulated and converted into a modulated light beam. The modulated light beam is condensed on a original disc which is coated with a photosensitive agent and undergoes synchronous rotation. A main track constituted by rows of intermittent pits is formed according to a repetition frequency of the main information signal, by a known developing process. Accordingly, the video signal and the first and second channel audio signals are simultaneously recorded on the same main track. Reference signals fp1 and fp2 for tracking control are applied to an independent light modulator (not shown) wherein a laser light is similarly modulated. The modulated light beam from this independent light modulator is used to form subtracks constituted by rows of intermittent pits, simultaneously with the forming of the main track. An information recording disc is duplicated from such an original disc, by a known disc pressing process.

Figure 3:
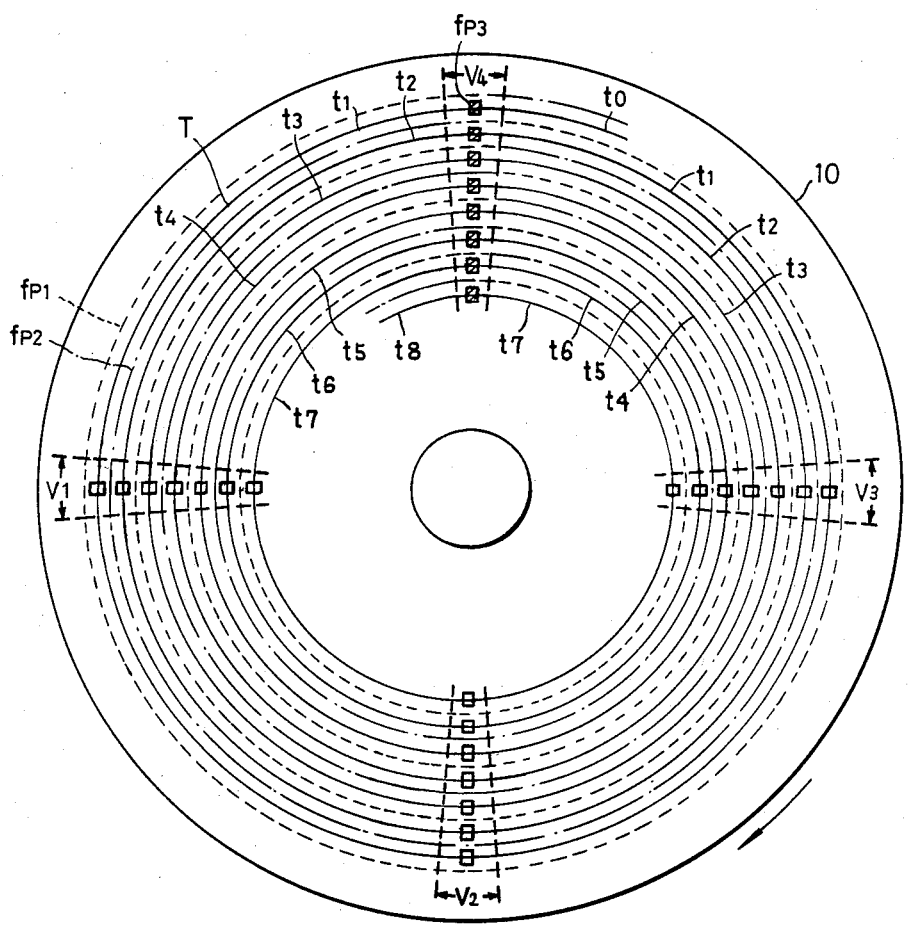
FIG. 3 shows an example of a track pattern formed on the information recording disc according to the present invention.

An information recording disc which is recorded and formed in this manner, has a track pattern shown in FIG. 3. The video and audio signals are recorded on a spiral track T of a disc 10, so that two frames, that is, four fields of the video signal are recorded in one track turn. In FIG. 3, a track turn of the reference signal fp1 is indicated by a broken line, and a track turn of the reference signal fp2 is indicated by a one-dot chain line. Positions where a vertical synchronizing signal is recorded in each of the fields, are indicated by rectangular marks. In addition, track parts of the spiral track T which correspond to one revolution of the disc, are indicated by track turns t1, t2, t3, ... A third reference signal fp3 is recorded at starting positions of each of the track turns t1, t2, t3, ... where the sides on which the reference signals fp1 and fp2 are recorded with respect to the track turns t1, t2, t3, ... change over, that is, at specific positions within a vertical blanking part V4 in which the vertical blanking periods are recorded. Four fields of the video signal are recorded in one track turn.

Pits having different lengths depending on the wavelengths of the main information signal, are formed intermittently along the spiral track T, and no guide groove is formed for guiding a reproducing element. The disc 10 has an electrode function, so that variations in the electrostatic capacitance between an electrode of the reproducing element which will be described hereinafter and the disc 10 can be detected. Further, an address signal which is used when carrying out a random access, is multiplexed with the video signal in a specific time period within the vertical blanking period.

According to the previously proposed information recording disc, the information signals of a plurality of parallel programs are switched in terms of a plurality of fields recorded in one track turn of the information recording disc or in terms of a number of fields smaller than the number of fields recorded in one track turn, and are time-sequentially recorded on the information recording disc.

On the other hand, according to the present invention, in a parallel program recorded region in which the information signals of parallel programs are recorded, at least an address signal recorded in the vertical blanking part V4 among the address signals recorded in the four vertical blanking parts V1 through V4 in which the vertical blanking periods are recorded, for example, has a signal format comprising predetermined codes which will be described later on in the specification. The remaining address signals recorded in the vertical blanking parts V1 through V3 have a known signal format which is identical to the signal format of the address signal recorded in a single program recorded region in which the information signal of only one program is recorded. In other words, when recoding an NTSC system television signal, for example, the horizontal and vertical synchronizing signals which are separated from the television signal and are in the vicinity of the vertical blanking period have the signal waveforms shown in FIG. 4(A). As shown in FIG. 4(C), the third reference signal fp3 is generated in a time period corresponding to the vertical synchronizing signal. Further, the first and and second reference signals fp1 and fp2 are generated with a period of one horizontal scanning period (1H) as shown in FIG. 4(D).

FIG. 4(B) shows that a chapter address signal $A_C$, a time address signal $A_T$, and a track number address signal $A_N$ are each transmitted within a time period of 1H corresponding to the scanning line numbers 17, 18, and 20, respectively. In the single program recorded region, all of the chapte, time, and track number address signals $A_C$, $A_T$, and $A_N$ are recorded in each of the vertical blanking parts V1 threough V4. On the other hand, in the parallel program recorded region, all of the chapter, time, and track number address signals $A_C$, $A_T$, and $A_N$ are recorded in each of the vertical blanking parts V1 through V3, for example. The chapter address signal $A_C$ is an address signal for indicating the signal recorded position on the information recording disc by the sequence of the recorded program, and the time address signal $A_T$ is an address signal for indicating the signal recorded position by the reproducing time. The track number address signal $A_N$ is an address signal for indicating the number of track turns when it is assumed that one track turn is formed from a starting point where the third reference signal fp3 is recorded as the information recording disc undergoes one revolution. Each of the chapter, time, and track number address signals $A_C$, $A_T$, and $A_N$ comprises 29 bits.

Figures 4, 5:
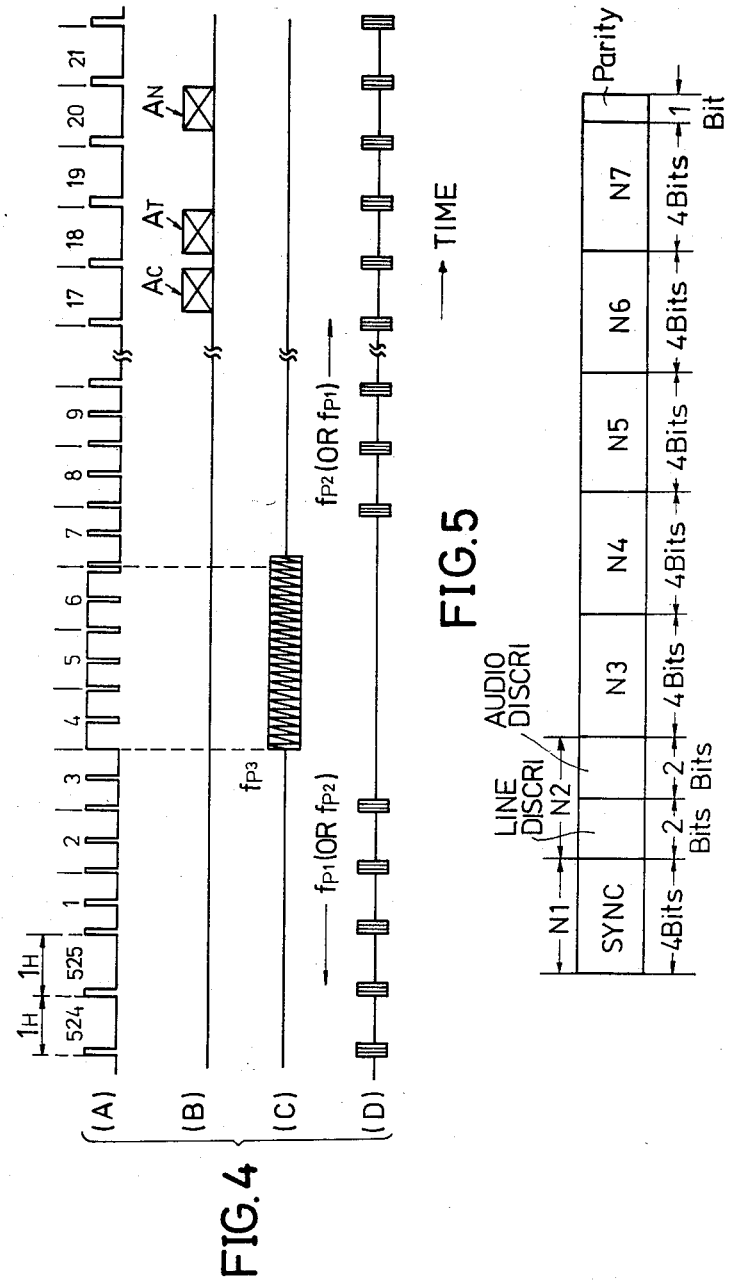
FIG. 5 shows an embodiment of a signal format of an address signal recorded on the information recording disc according to the present invention.

FIG. 5 shows an example of the signal format of the addess signals. In FIG. 5, a synchronizing signal having a fixed pattern (for example, a value "C" in hexadecimal) is arranged in first through fourth bits represented by SYNC. A line discrimination code is arranged in the two bits subsequent ot the synchronizing signal bits SYNC, and an audio discrimination code is arranged in the two bits subsequent to the line discrimination code. The line discrimination code is used to discriminate the scanning line number in which the address signal is transmitted. The audio discrimination code is used to discriminate the type of the recorded audio signals, such as stereo, monaural and bilingual. An address data is arranged in the ninth through twenty-eighth bits which amount to 20 bits in total. The last bit is a parity bit. The 20 bits constituted by the ninth through twenty-eighth bits are divided into portions of four bits and are represented by N3, N4, N5, N6, and N7 as shown in FIG. 5.

The address signals described before recorded at three positions within the vertical blanking part V4, for example, within a recorded region other than the single program recorded part of the information recording disc, are each constituted by 29 bits as in the case of the address signals $A_C$, $A_T$ and $A_N$ shown in FIG. 5. However, first through fifth codes shwon in FIG. 6 are arranged in each of the 4-bit portions N3 through N7. In other words, first and seventh region are single program recorded regions, and third through sixth regions are parallel program recorded regions. A second region is recorded with a program in which the fields are continuous so as to prevent an unnatural picture from being reproduced until the reproducing element enters the third region even when the reproducing apparatus performs an erroneous operation. A more detailed description will be given with respect to the first through seventh regions later on in the specification by referring to FIGS. 7A and 7B.

In a region other than the single program recorded region, a fist code N3 having a value "B" in hexadecimal is arranged in the 4-bit portion N3 shown in FIG. 5. The first code N3 indicates a recorded region in which the reproducing element is to be forcibly shifted (kicked) from one track turn to another track turn during a normal reproduction mode. A second code N4 indicating a parallel program as shown in FIG. 6 is arranged in the 4-bit portion N4 shown in FIG. 5. The second code N4 assumes a value "A" in hexadecimal in the case of a parallel program recorded region, and assumes a value "E" in hexadecimal in the case of a recorded region (hereinafter referred to as a connecting region) for smoothly moving from a parallel program within an arbitrary parallel program recorded region to a program of a subsequent single program recorded region.

A third code N5 indicating a kick pattern which is determined as will be described later, is arranged in the 4-bit portion N5 shown in FIG. 5. A fourth code N6 indicating the number of parallel programs is arranged in the 4-bit portion N6 shown in FIG. 5. As shown in FIG. 6, the four bits of the fourth code N6 from the most significant bit (MSB) B3 to the least significant bit (LSB) B0 indicate the number of parallel programs in binary code with an offset value of −1. Accordingly, the number of parallel programs is equal to "3" when the fourth code N6 assumes a value "0010". A fifth code N7 shown in FIG. 6 for indicating the program number of a program which is presently being reproduced in a hexadecimal value, is arranged in the 4-bit portion N7 shown in FIG. 5. The fifth code N7 is equal to zero in the sixth region.

In FIG. 6, each of the third through fifth codes N5 through N7 arranged in the 4-bit portions N5 through N7 assumes the value in one of the fifteen rows in the third through fifth regions and assumes the value in one of the sixteen rows in the sixth region, depending on the number of parallel programs. Accordingly, in a case where the number of parallel programs is equal to "4" in the third region, for example, the third code N5 which is arranged in the 4-bit portion N5 assumes a value "1110" and the fourth code N6 arranged in the 4-bit portion N6 assumes a value "0011", as shown in FIG. 6. In this case, the fifth code N7 arranged in the 4-bit portion N7 assumes a 4-bit value indicating the program number (one of the values "0" through "3" in hexadecimal) of the information signal recorded in one field next to the vertical blanking part V4. The third code N5 assumes the same value in each of the ranges in which the number of parallel programs is in a range of "1" to "4", a range of "5" to "8", a range of "9" to "12", and a range of "13" to "16".

In FIG. 6, a number K indicates a number of track pitches (number of track turns) over which the reproducing element is to be kicked in the normal reproduction mode at each of the vertical blanking parts V1 through V4. It will be assumed that the number of track pitches the reproducing element is to be kicked (hereinafter simply referred to as a kicking track number) is equal to $K_{V1}$, $K_{V2}$, $K_{V3}$ and $K_{V4}$ in the blanking parts V1, V2, V3 and V4, respectively. The kicking track numbers are uniquely determined by the value of the fourth code N6 which indicates the number of parallel programs as shown in FIG. 6, regardless of the program number.

In order to use a coding system to describe the kick track numbers $K_{V1}$ through $K_{V4}$, three bits will be required for each kick track number and a total of twelve bits will be required for the four kick track numbers because the maximum value of each kick track number is equal to "4" as shown in FIG. 6. For this reason, the four bits of the third code N5 are insufficient to describe the kick track numbers. However, it is seen from FIG. 6 that the difference between the values of the kick track numbers $K_{V1}$ through $K_{V4}$ within each row is equal to "1" at the most. Further, when the value of the MSB of the fourth code N6 in a predetermined row is represented by (N6, B3) and the value of the second MSB of the fourth code N6 in the same predetermined row is represented by (N6, B2), the value of the kick track number having the smallest value in the predetermined row can be described by $(N6, B2)+2\times(N6, B3)$. When the smallest value of the kick track number in the predetermined row is subtracted from each of the kick track numbers $K_{V1}$ through $K_{V4}$ in the same predetermined row, the third code N5 of the same predetermined row is obtained as shown in FIG. 6. In other words, the third code N5 is arranged in the 4-bit portions N5 shown in FIG. 5 as a 4-bit code describing the kick pattern. When the values of the four bits of the third code N5 are represented by (N5, V1), (N5, V2), (N5, V3) and (N5, V4), the kick track numbers $K_{V1}$ through $K_{V4}$ (the number of track pitches over which the reproducing element is to be kicked) in the vertical blanking parts V1 through V4 during the normal reproduction mode in which a parallel program is reproduced, can be calculated from the following four equations based on the values of the third and fourth codes N5 and N6.

$K_{V1}=(N5, V1)+(N6, B2)+2\times(N6, B3)$
$K_{V2}=(N5, V2)+(N6, B2)+2\times(N6, B3)$
$K_{V3}=(N5, V3)+(N6, B2)+2\times(N6, B3)$
$K_{V4}=(N5, V4)+(N6, B2)+2\times(N6, B3)$ As described before, the values of the kick track numbers $K_{V1}$ through $K_{V4}$ are uniquely determined by the value of the fourth code N6. Accordingly, the value of the third code N5 describing the kick pattern, is also uniquely determined by the value of the fourth code N6. Hence, when the information of the third code N5 corresponding to the fourth code N6 is stored in advance within a memory circuit of the reproducing apparatus, it is possible to read out from the memory circuit the third code N5 corresponding to the fourth code N6 within the reproduced address signal by referring to the information of the fourth code N6, and an arbitrary program can be reproduced correctly in the normal reproducing mode. For this reason, the third code N5 arranged in the 4-bit portion N5 does not need to be recorded on the information recording disc. However, in the present embodiment, the description is given for the case where the third code N5 is recorded on the information recording disc.

Figure 7A:
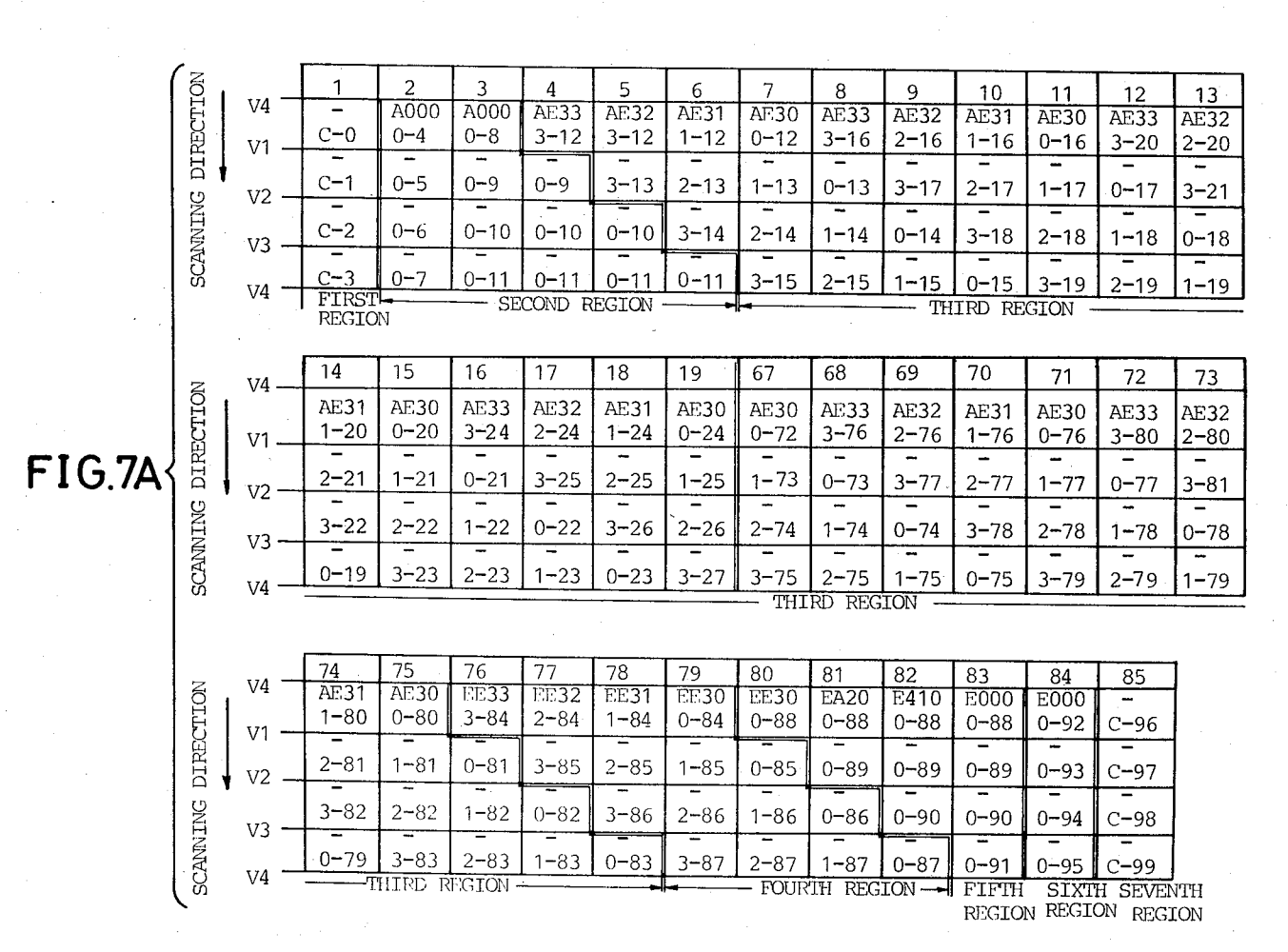
Figure 7B:
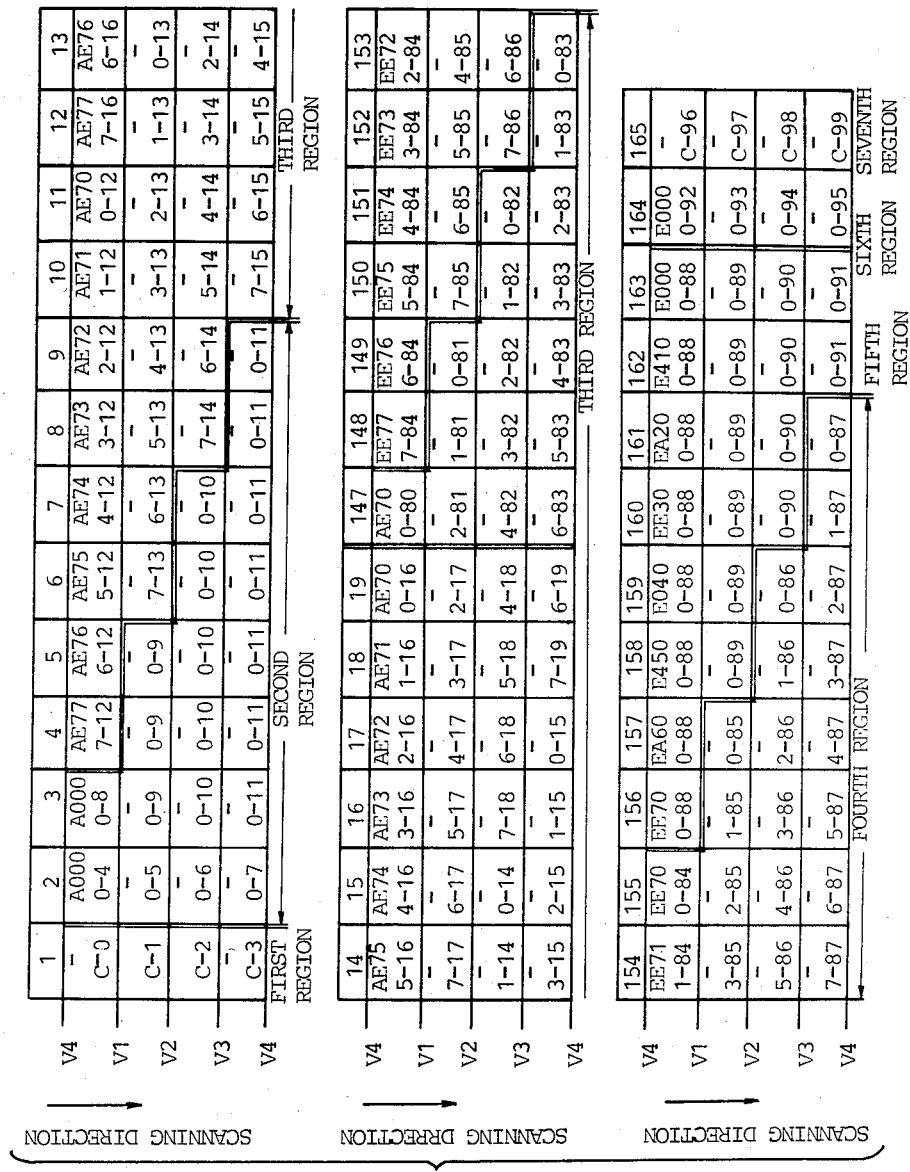

Next, each embodiment of the information recording disc in which the parallel program recorded region comprising the parallel programs is time-sequentially formed between two single program recorded regions, by referring to FIGS. 7A and 7B. FIGS. 7A and 7B show first and second embodiments of the information content recorded on the information recording disc for cases where the number of parallel programs is equal to "4" and "8", respectively. In FIGS. 7A and 7B, each block schematically shows the recorded content of the information signal corresponding to one field. In addition, the scanning direction of the track turn is illustrated in the vertical direction and the track member is illustrated in the horizontal direction. Further, the alphabets and numbers in the four digits shown in the upper part of each block indicate the hexadecimal value of the second, third, fourth and fifth codes N4, N5, N6 and N7 arranged in the 4-bit portions N4, N5, N6 and N7 shown in FIG. 5, and a hyphenated number shown in the lower part of each block indicates the program number by the decimal number on the left of the hyphen and the field number by the decimal number on the right of the hyphen. However, the program number is indicated by a character "C" for a common single program which is reproduced in common regardless of the selected parallel program, and a symbol "—" in the upper part of each block indicates that the normal address signals (the address signals $A_C$, $A_T$ and $A_N$ described before) are recorded. Accordingly, the first and seventh regions are single program recorded regions.

The second region is a lead-in region for the parallel program recorded region, as will now be described by referring to FIG. 7A. The second region comprises two track turns having the program number "0" and number of parallel programs "1" (the track turns having the track numbers "2" and "3", that is, the second and third track turns), the second through fourth fields of the fourth track turn, the third and fourth fields of the fifth track turn, and the fourth field of the sixth track turn, when it is assumed that the first field in each track turn is the one field next to the vertical blanking part V4 in which the third reference signal fp3 is recorded. The third region is a parallel program recorded region. Normally, the reproducing element moves from the fourth field of the third track turn in the second region to a program having the largest program number in the third region, and in this case, the reproducing element moves to the first field of the fourth track turn in the third region. Accordingly, in the second region, a specific portion after the first field of the fourth track turn are normally not scanned by the reproducing element. However, by providing in the second region the specific portion in which the same video and audio signals are recorded among corresponding fields of the adjacent track turns, it is possible to prevent the reproduction of an unnatural picture and sound even when the field in the specific portion of the second region is reproduced due to an erroneous operation of the reproducing apparatus. When an erroneous operation occurs, the reproducing element does not necessarily move to the program having the largest program number in the third region.

The fourth region is a specific region within the connecting region which will be described later for smoothly moving the reproducing element to the program having the program number "0" in the fifth region. In a case where the second code N4 arranged in the 4-bit portion N4 assumes a value "E" in hexadecimal, the reproducing element is kicked from the first field of the seventy-sixth track turn to the second field of the eightieth track turn so as to reproduce the program having the program number "0". In other words, the fourth region is a specific region for controlling and smoothly moving the reproducing element from each of the programs in the third region to the program having the program number "0" in the fifth region.

The fifth region is a correcting region within the connecting region which will be described later for correcting an error introduced in the foruth region due to an erroneous operation of the reproducing apparatus. When the reproducing element is moved erroneously in the fourth region and is not moved to the correct track turn, the reproducing element is gradually kicked in the inner peripheral direction of the information recording disc (hereinafter also referred to as an inward kick) over one or two track turns in the vertical blanking parts V1, V2, V3 and V4 so as to correct the error by moving the reproducing element to the innermost peripheral track turn. In the embodiment shown in FIG. 7A, the reproducing element scans from the first field of the eighty-third track turn in accordance with the scanning method determined by the number of programs which is equal to "1" and the program number which is equal o "0". However, when the changing of programs does not take place in the fourth region, such as a case where the reproducing element scans from the fourth field of th eighty-first track turn and moves to the first field of the eighty-second track turn, the reproducing element is moved in accordance with the value "E410" of the second through fifth codes N4 through N7. That is, the reproducing element is moved in accordance with the scanning method determined by the number of programs which is equal to "2" and the program number which is equal to "0" in this case, and thus, the reproducing element is moved from the second field of the eighty-second track turn to the third track turn of the eighty-third track turn and is thereafter moved to the sixth region by way of the fourth field of the eighty-third track turn. Accordingly, the program having the program number "0" is always reproduced as the reproducing element moves from the fifth region to the sixth region, with the same real-time. The same video and audio signals are recorded among corresponding fields of the adjacent track turns in the fifth region, so as to prevent the reproduction of an unnatural picture and sound.

Figure 13A:
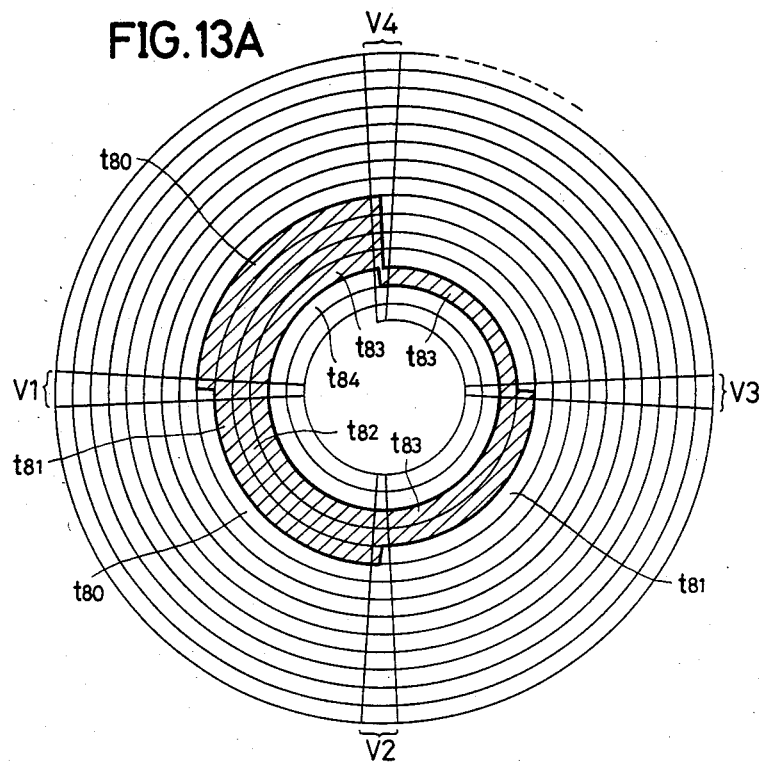
FIGS. 13A and 13B shows examples of a specific region within a connection region of the information recording disc and a scanning locus of the reproducing element which scans over the specific region.
Figure 13B:
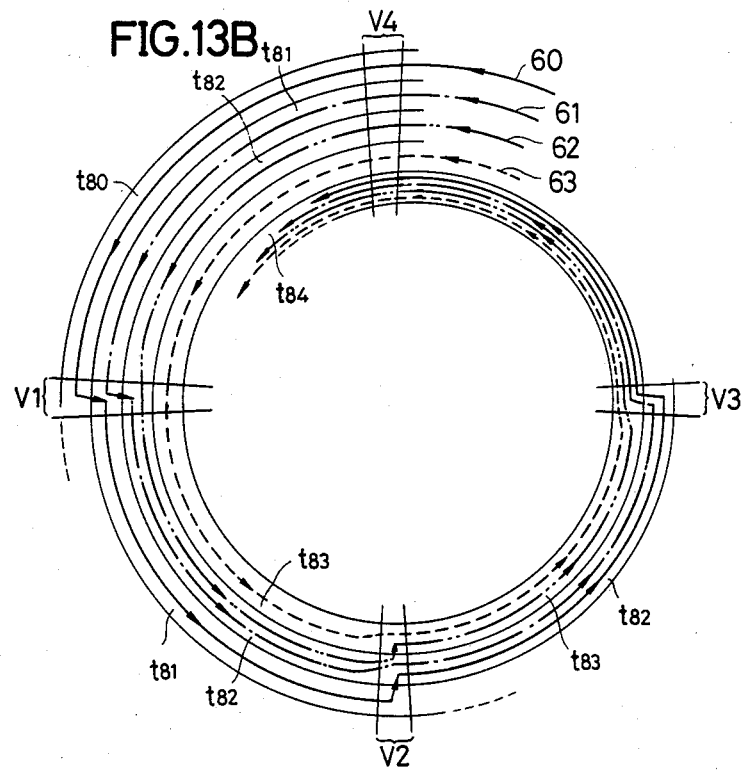

The fifth region shown in FIG. 7A corresponds to a region indicated by the hatchings in the information recording disc shown in FIG. 13A. In FIG. 13A and FIG. 13B, the track turns having the track numbers "80" through "84" are represented by track turns $t_{80}$ through $t_{84}$, respectively. As may be seen from FIG. 7A, video signals corresponding to four fields (field numbers 88 through 91 in this case) which is equal to the number of fields recorded in one track turn, are recorded in each of the track turns $t_{80}$ through $t_{83}$ which constitute the fifth region. The video signal of the same field is recorded in the two adjacent track turns among the track turns $t_{80}$ through $t_{83}$. As shown in FIG. 13A, in the first fields between the vertical blanking parts V4 and V1, the video signal of the same field number 88 is recorded in each of the four track turns $t_{80}$ through $t_{83}$. In the second fields between the vertical blanking parts V1 and V2, the video signal of the same field number 89 is recorded in each of the three track turns $t_{81}$ through $t_{83}$. In the third fields between the vertical blanking parts V2 and V3, the video signal of the same field number 90 is recorded in each of the two track turns $t_{82}$ and $t_{83}$. In the fourth field between the vertical blanking parts V3 and V4, the video signal of the field number 91 is only recorded in the track turn $t_{83}$. In other words, in the fifth region, the number of acjacent track turns recorded with the video signal of the same field decreases as the field advances.

Depending on the scanning locus of the reproducing element in the first through fourth regions, the reproducing element enters the fifth region as indicated by one of a solid line 60, a one-dot chain line 61, a two-dot chain line 62 and a phantom line 63 in FIG. 13B. In each case, the reproducing element always scans the first field of one of the track turns $t_{80}$ through $t_{83}$, reproduces the first through fifth codes N3 through N7 within the address signals recorded at three positions within the vertical blanking part V4, and is kicked responsive to the reproduced first through fifth codes N3 through N7. Accordingly, in a case where the reproducing element reproduces the vertical blanking part V4 of the track turn $t_{80}$, the reproducing element scans over the scanning locus indicated by the solid line 60 in FIG. 13B. Similarly, the reproducing element scans over the scanning loci indicated by the one-dot chain line 61, the two-dot chain line 62 and the phantom line 63 in FIG. 13B in cases where the reproducing element reproduces the vertical blanking parts V4 of the track turns $t_{81}$, $t_{82}$ and $t_{83}$, respectively. Therefore, the reproducing element always enters the fifth region and leaves the fifth region in one track turn, so as to move to the first field of the sixth region. In other words, the reproducing element is always converges to the first field of the track turn t84 in the sixth region, regardless of the scanning locus of the reproducing element up to the sixth region, that is, regardless of which parallel program the reproducing element has been reproduced up to the sixth region.

Consequently, by passing the reproducing element through the fifth region, the reproducing element always converges to the first field of the track turn having the program number "0" in the sixth region, regardless of which parallel program among the plurality of parallel programs the reproducing element has been reproducing up to the sixth region. For this reason, the reproducing time is always constant regardless of which parallel program the reproducing element has been reproducing.

The sixth region is a region within the connecting region which will be described later where the parallel program recorded region ends. As described before, it takes the same real-time for the reproducing element to reach the sixth region by way of a program having an arbitrary program number. The reproducing element converges to the track turn within the sixth region having the number of programs which is equal to "1" and the program number which is equal to "0", and thereafter moves to the seventh region which is a single program recorded region. As described heretofore, the reproducing element is moved from the single program recorded region to the program having the largest program number within the parallel program recorded region, is moved within the parallel program recorded region so as to change the program which is being reproduced according to the needs, is converged to a program having the program number "0" within the connection region (constituted by the fourth through sixth regions) regardless of whether the second code N4 having the hexadecimal value "E" is detected, with the same real-time regardless of which program is reproduced in the parallel program recorded region, and is thereafter moved to the subsequent single program recorded region.

Figure 8:
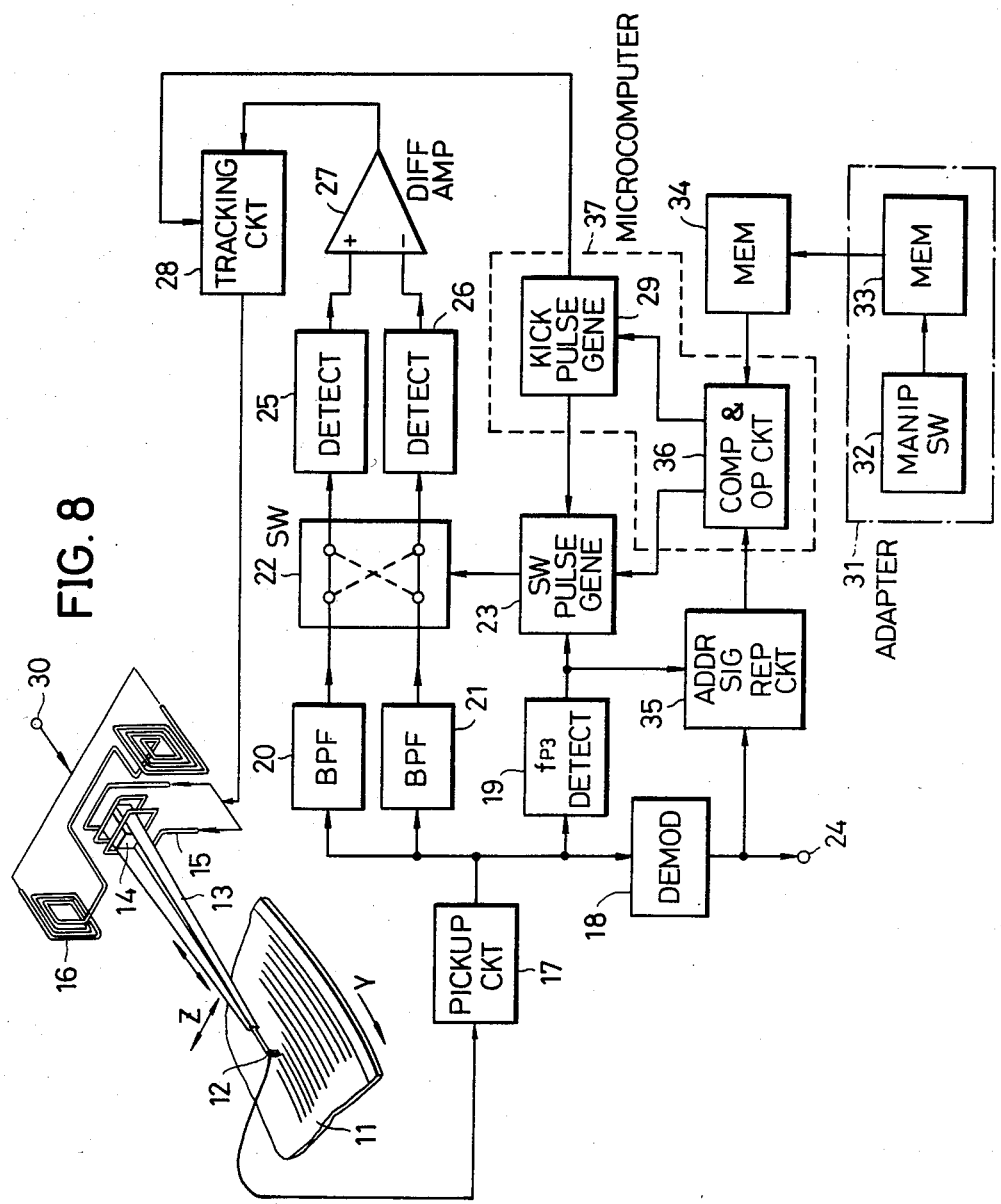
FIG. 8 is a system block diagram showing an embodiment of the reproducing apparatus according to the present invention.

Next, a description will be given with respect to the reproducing apparatus according to the present invention for playing the information recording disc according to the present invention described heretofore, by referring to FIG. 8. In FIG. 8, an information recording disc 11 having the track pattern shown in FIG. 3 and having the program recording arrangement shown in FIGS. 7A or 7B, is placed on a turntable (not shown) and is rotated in synchronism at a rotational speed of approximately 900 rpm. For example, a reproducing stylus 12 which is used as the reproducing element, scans over the disc 11 by making sliding contact with the recording surface of the disc 11.

The reproducing stylus 12 is fixed to one end of a cantilever 13, and a permanent magnet 14 is fixed to the other base end of the cantilever 13. The base end of the cantilever 13 where the permanent magnet 13 is fixed, is surrounded by a tracking coil 15 and a jitter compensation coil 16 of the reproducing apparatus. Since right and left coil parts of the jitter compensation coil 16 are wound with the same phase, an attractive or repulsive force acts on the permanent magnet 14 from the two coil parts simultaneously, responsive to the polarity of a jitter compensation signal applied to an input terminal 30. Accordingly, the cantilever 13 is moved tangentially to the track turn of the disc 11, so as to compensate for the jitter caused by surface fluctuation and eccentricity of the disc 11. The tracking coil 15 generates a magnetic field perpendicular to the direction of the magnetic field generated by the permanent magnet 14, and moves the cantilever 13 in the track width direction (arrow direction Z) in FIG. 8 responsive to the polarity of a tracking error signal from a tracking circuit 28, with a displacing quantity in accordance with the magnitude of the tracking error signal.

The electrostatic capacitance between the recording surface of the disc 11 and an electrode of the reproducing stylus 12 varies according to the rows of intermittent pits formed on the disc 11, and the resonance frequency of a resonator circuit (not shown) within a pickup circuit 17 is varied according to this variation in the electrostatic capacitance. For example, the electrode of the reproducing stylus 12 is formed on the rear surface of the reproducing stylus 12 by vapor deposition. In addition to this resonator circuit, the pickup circuit 17 comprises a high frequency oscillator (not shown) for applying to the resonator circuit an external signal having a constant frequency of approximately 1 GHz, for example, an amplitude detecting circuit (not shown), and a preamplifying circuit (not shown). Because the amplitude of the signal having the constant frequency which is obtained from the resonator circuit varies according to the variation in the electrostatic capacitance, that is, according to the variation in the resonance frequency of the resonator circuit, the amplitude detecting circuit is provided to detect this variation in the amplitude. The preamplifying circuit amplifies the amplitude detected signal from the amplitude detecting circuit.

A high frequency reproduced signal obtained from the pickup circuit 17, is supplied to a demodulating circuit 18 which will be described hereinafter wherein the reproduced signal is frequency-demodulated and the main information signal (the video signal and the FM audio signals in this case) is obtained. On the other hand, the reproduced signal from the pickup circuit 17 is also supplied to an fp3 detector 19, and bandpass filters 20 and 21.

The fp3 detector 19 frequency-selects the reference signal fp3 within the reproduced signal, and applies an fp3 detection signal which is in phase with the reference signal fp3 to a switching pulse generator 23. In addition, the bandpass filter 20 frequency-selects the reference signal fp1 within the reproduced signal, and applies the reference signal fp1 to one input terminal of a gate switching circuit 22. On the other hand, the bandpass filter 21 frequency-selects the reference signal fp2 within the reproduced signal, and applies the reference signal fp2 to the other input terminal of the gate switching circuit 22. The gate switching circuit 22 is switched responsive to the switching pulse from the switching pulse generator 23. For example, outputs of the bandpass filters 20 and 21 are independently connected to inputs of detectors 25 and 26 during the high level period of the switching pulse, and the outputs of the bandpass filters 20 and 21 are independently connected to the inputs of the detectors 26 and 25 during a low level period of the switching pulse.

The polarity and period of the switching pulse generated by the switching pulse generator 23 and the polarity and period of a kick pulse generated by a kick pulse generator 29, are varied in response to a reproducing mode signal which is supplied to the switching pulse generator 23 and kick pulse generator 29 through a comparator and operational circuit 36. The polarity of the switching pulse is varied when the detection signal is generated by the fp3 detector 19 or when the kick pulse (excluding the kick pulse generated during a time period in which the reference signal fp3 is reproduced) is generated by the kick pulse generator 29 and supplied to the tracking circuit 28. Thus, an envelope of the reference signal reproduced from the subtrack on the outer peripheral side of the disc 11 with respect to the main track which is to be reproduced, is detected by the detector 25. On the other hand, an envelope of the reference signal reproduced from the subtrack on the inner peripheral side of the disc 11 with respect to the main track which is to be reproduced, is detected by the detector 26. Envelope detection signals produced from these detectors 25 and 26, are supplied to a differential amplifier 27 provided in a subsequent stage. The differential amplifier 27 produces a tracking error signal having a polarity which is dependent on the direction of the tracking error, and having a level which is dependent on the quantity of the tracking error. This tracking error signal is converted into a predetermined driving voltage in the tracking circuit 28, and is then applied to the tracking coil 15 within the signal pickup device. As a result, the stylus tip of the reproducing stylus 12 is displaced in a radial direction of the disc 11 with a quantity so as to correct the tracking error.

An adapter 31 comprises manipulation switch 32 and a memory 33. The manipulation switch 32 comprises switches for selecting an arbitrary program from among the plurality of parallel programs. An output signal of the manipulation switch 32 is supplied to the memory 33 so as to read out an address signal indicating a program number which corresponds to the selected program. The address signal read out from the memory 33 is supplied to a memory 34. The memory 34 stores the address signal from the memory 33, and supplies this address signal to the comparator and operational circuit 36.

On the other hand, the signal demodulated in the demodulating circuit 18 is supplied to a video signal processing circuit (not shown) provided in a stage subsequent to an output terminal 24. The output signal of the demodulating circuit 18 is also supplied to an address signal reproducing circuit 35. The address signal reproducing circuit 35 reproduces the address signals including the program number code and the like and are multiplexed and recorded at three positions within the vertical blanking part V4 of the video signal, and counts the number of vertical synchronizing signals so as to detect which vertical synchronizing signal is reproduced when the detection signal is supplied to the address signal reproducing circuit 35 from the fp3 detector 19.

The comparator and operational circuit 36 discriminates from the output address signals of the address signal reproducing circuit 35 whether the first code N3 arranged in the 4-bit portion N3 shown in FIG. 5 assumes the hexadecimal value "B" indicative of a region other than the single program recorded region. When the code arranged in the first code N3 assumes the hexadecimal value "B", the comparator and operational circuit 36 calculates the required kick track numbers $K_{V1}$ through $K_{V4}$ based on the program number N from the memory 34 and the first through fifth codes N3 through N7 within the reproduced address signals from the address signal reproducing circuit 35. Further, the comparator and operational circuit 36 supplies a control signal to the kick pulse generator 29 so as to control the number of kick pulses generated from the kick pulse generator 29. The comparator and operational circuit 36 and the kick pulse generator 29 are constituted by a microcomputer 37, for example. The microcomputer 37 performs operations in accordance with the flow charts shown in FIGS. 9 and 10.

In FIG. 9, when the operator manipulates the manipulation switch 32 and sets the program number N of a desired program which is to be reproduced, the microcomputer 37 in a step 41 obtains as input the desired program number N which received through the memories 33 and 34. Next, in a step 42, the microcomputer 37 obtains as input a program number M of the program which is presently being reproduced. The kick track numbers $K_{V1}$ through $K_{V4}$ are calculated in a step 43 based on the third and fourth codes N5 and N6. A difference $(N-M-K_{V1})$ of the program numbers N and M and the kick track number $K_{V1}$ is calculated and a discrimination is performed in a step 44 to determine whether the difference $(N-M-K_{V1})$ is greater than zero. A step 45 generates $(-N+M+K_{V1})$ kick pulses for kicking the reproducing stylus 12 in the inner peripheral direction of the disc 11 (inward) in the vertical blanking part V1, when the discrimination result in the step 44 is NO. On the other hand, a step generates $(N-M-K_{V1})$ kick pulses for kicking the reproducing stylus 12 in the outer peripheral direction of the disc 11 (outward) in the vertical blanking part V1, when the discrimination result in the step 44 is YES. Accordingly, the reproducing stylus 12 is kicked by a number of track pitches responsive to the value of the difference $(N-M-K_{V1})$, in a direction responsive to the polarity of the difference $(N-M-K_{V1})$.

Next, every time the reproducing stylus 12 reproduces one of the vertical blanking parts V2, V3 and V4, the microcomputer 37 generates $K_{V2}$, $K_{V3}$ or $K_{V4}$ kick pulses for kicking the reproducing stylus 12 in the inner peripheral direction of the disc 11 in a step 47. The operation of the microcomputer 37 returns to the step 42. The reproducing stylus 12 is kicked over one track pitch responsive to one kick pulse. Further, the reproducing stylus 12 is kicked within the vertical blanking part V1, V2, V3, or V4 at a position immediately after the reproduction of the vertical synchronizing signal and immediately before each of the address signals are reproduced, such as a position in a vicinity of the horizontal scanning line number 11 or 274.

According to the present embodiment, when the microcomputer 37 detects in a step 50 shown in FIG. 10 that a program in the third region is being reproduced, a step 51 discriminates whether the second code N4 assumes the hexadecimal value "E", that is, whether the program being reproduced is in one of the fourth through sixth regions. When the discrimination result in the step 51 is YES, the program number M of the program which is presently being reproduced is obtained as input in a step 52. A step 53 calculates the kick track numbers $K_{V1}$ through $K_{V4}$ which are required to follow the program. A step 54 generates $M+K_{V1}$, $K_{V2}$, $K_{V3}$ and $K_{V4}$ kick pulses for kicking the reproducing stylus 12 in the inner peripheral direction of the disc 11 in the vertical blanking parts V1, V2, V3 and V4, respectively. A step 55 discriminates whether the program number M is equal to "0", and the steps 52 through 55 are repeated until the discrimination result in the step 55 becomes YES. A step 56 controls the reproducing stylus 12 to scan in accordance with the third through fifth codes N5, N6 and N7.

For example, in a case where four parallel programs are recorded in the third region of the disc 11 and the program number M of the program which is presently being reproduced is equal to "3", the step 53 shown in FIG. 10 calculates the kick track numbers $K_{V1}$ through $K_{V4}$ and obtains the values $K_{V1}=K_{V2}=K_{V3}=1$ and $K_{V4}=0$ shown in FIG. 6. The step 54 generates the kick pulses for kicking the reproducing stylus 12 in the inner peripheral direction of the disc 11 every time one of the vertical blanking parts V1, V2 and V3 is reproduced. Further, in synchronism with the generation of the kick pulses, switching pulses for inverting the tracking polarity is generated in the vertical blanking parts V1, V2, V3 and V4. Accordingly, the reproducing stylus 12 scans over a scanning locus indicated by a solid line in FIG. 11, and the parallel program having the program number "3" is reproduced in the normal reproduction mode in a sequence of programs $P_{30} \rightarrow P_{31} \rightarrow P_{32} \rightarrow \ldots$ In FIG. 11, a program $P_{jk}$ represents a field of the information signal having a program number j and a field number k.

Identical address signals comprising the first through fifth codes N3 through N7 are reproduced from three positions in the parallel program recorded region. However, it is possible to use only the address signal reproduced from an arbitrary position out of the three positions. Further, it is possible to use the majority of the address signals reproduced from the three positions, so as to compensate for a read-out error which may occur.

Figure 11:
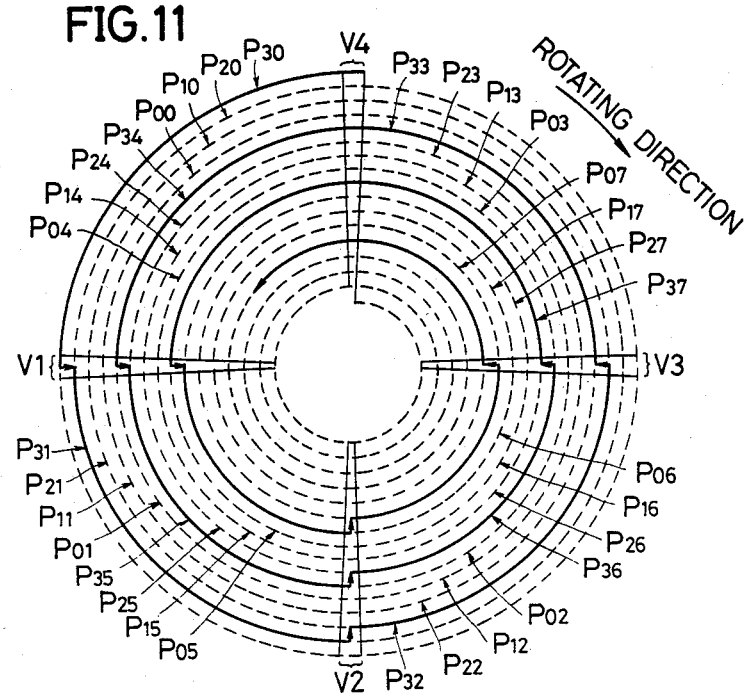
FIG. 11 shows an example of a scanning locus of a reproducing element when the information recording disc according to the present invention is played in a normal reproduction mode.

The manipulation switch 32 sets the track turn and the vertical blanking part among the vertical blanking parts V1, V2, V3 and V4 from which the scanning locus shown in FIG. 11 is to start. Accordingly, an arbitrary program among the plurality of parallel programs is reproduced by the setting made by the manipulation switch 32.

Next, a description will be given with respect to a case where one program which is being reproduced in the normal reproduction mode is instantaneously changed to another predetermined program, so as to obtain the normal reproduced picture and the normal reproduced sound of the predetermined program. According to a first method, the reproducing stylus 12 is not kicked at the position where the reproducing stylus 12 should be kicked during the normal reproduction of the one program, and the reproducing stylus 12 is kicked in the original sequence after the next vertical blanking part is reproduced. For example, when the program being reproduced is to be changed from a program having the program number "0" to a program having the program number "1" on the disc having the program arrangement shown in FIG. 11, the kicking of the reproducing stylus 12 is not performed once after one field of the program having the program number "0" is reproduced. In other words, the reproducing stylus 12 scans the programs $P_{00}$ and $P_{11}$ in a sequence of the programs $P_{00} \rightarrow P_{11}$. However, when changing the program which is being reproduced from the program having the program number "0" to a program having the program number "3", the reproducing stylus 12 is not kicked in the vertical blanking parts V1, V2 and V3 so that the reproducing stylus 12 scans the programs $P_{00}$, $P_{11}$, $P_{22}$ and $P_{33}$ in a sequence of the programs $P_{00} \rightarrow P_{11} \rightarrow P_{22} \rightarrow P_{33}$. In this case, it takes more time in the latter case for the reproducing stylus 12 to reach the program $P_{33}$ compared to the former case.

Figure 12:
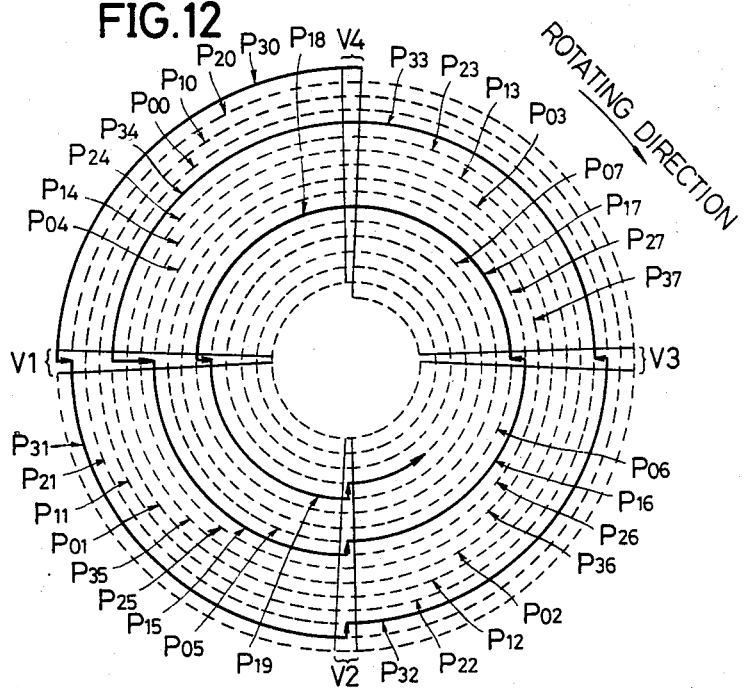
FIG. 12 shows an example of a scanning locus of the reproducing element when a parallel program which is being reproduced is switched to another program in the normal reproduction mode in which the parallel program is reproduced.

On the other hand, according to the present invention, the program being reproduced is instantaneously changed from one program to another program in accordance with the method described before in conjunction with FIG. 9. In other words, in a case where the manipulation switch 32 sets the desired program number N to "1" during reproduction of the parallel program $P_{34}$ (fourth field of the program having the program number "3") on the disc having the same program arrangement as the disc shown in FIG. 11, the microcomputer 37 generates kick pulses based on the third and fourth codes N5 and N6 reproduced from the vertical blanking part V4 at the beginning of the program $P_{34}$. The microcomputer 37 generates three kick pulses in the vertical blanking part V1 subsequent to the reproduction of the program $P_{34}$, generates one kick pulse in each of the vertical blanking parts V2 and V3 subsequent to the reproduction of the programs $P_{15}$ and $P_{16}$, respectively, and generates no kick pulse in the vertical blanking part V4 subsequent to the reproduction of the program $P_{17}$. Accordingly, the reproducing stylus 12 scans over a scanning locus indicated by a solid line in FIG. 12. The program which is being reproduced is instantaneously changed from the parallel program $P_{34}$ having the program number "3" to the parallel program $P_{15}$ having the program number "1", by the kicking of the reproducing stylus 12 at the vertical blanking part V1 subsequent to the reproduction of the program $P_{34}$. Thereafer, the parallel program having the program number "1" is reproduced in the normal reproduction mode in the sequence of the programs $P_{16} \rightarrow P_{17} \rightarrow P_{18} \rightarrow \ldots$ Descriptions were given heretofore for a case where the information recording disc according to the present invention is applied to the previously proposed information recording disc. However, the information recording disc according to the present invention may be applied to an information recording disc which is recorded with two fields of video signals per track turn, for example. Further, the reproducing element of the reproducing apparatus is not limited to the reproducing stylus, and the reproducing apparatus according to the present invention may be applied to other types of apparatuses, such as an apparatus which reads recorded signals from an optical type information recording disc by use of a laser beam. In this case, the recorded signals are picked up from the optical type information recording disc by detecting variations in the intensity of light reflected by or transmitted through the optical type information recording disc.

Further, the present invention is not limited to these embodiments, but various variations and modifications may be made without departing from the scope of the present invention.

What is claimed is:

1. An information recording disc for use on a reproducing apparatus having a reproducing element for reproducing signals from the information recording disc, said information recording disc comprising:
   a recording surface;
   a spiral track formed on said recording surface, said spiral track being made up of a plurality of track turns and being recorded with information signals including at least video signals, said information signals making up a plurality of information programs which are categorized into parallel information programs and a single information program, only one of a plurality of parallel information programs being selectively reproduced at one time, portions of said plurality of parallel information programs being sequentially recorded with a period equal to a predetermined number of video fields of the video signals, said predetermined number being less than or equal to a number of video fields recorded in one track turn;

a parallel program recorded region formed in at least a part of said recording surface, said parallel program recorded region comprising within a predetermined sector on said recording surface a plurality of adjacent track turns recorded with information signals of the same video field number and making up said plurality of parallel information programs;

a single program recorded region formed in a part of said recording surface and recorded with a single information program which is to be reproduced after one of said plurality of parallel information programs in said parallel program recorded region is reproduced; and a connecting region formed in a part of said recording surface between said parallel program recorded region and said single program recorded region for smoothly guiding said reproducing element from said parallel program recorded region to said single program recorded region, each of said parallel program recorded region and said connecting region comprising track turns having vertical blanking parts recorded with vertical blanking periods of the video signals, at least of said vertical blanking parts in each track turn being recorded with an address signal comprising a first code indicating whether an information program recorded in a track turn of a region is a single information program or a parallel information program, a second code indicating whether the region is the parallel program recorded region or the connecting region, a fourth code indicating the number of information programs recorded in the region, and a fifth code indicating the information program number of the information program recorded in the region.

2. An Information recording disc as claimed in claim 1 in which said address signal comprises a third code indicating a value required for calculating a number of track turns over which the reproducing element of the reproducing apparatus is to be kicked from one track turn to another track turn within one or more blanking parts during a normal reproduction mode so that one of said plurality of parallel information programs is continuously and selectively reproduced by the reproducing element.

3. An information recording disc as claimed in claim 1 which further comprises a recorded region formed immediately prior to said parallel program recorded region for moving the reproducing element of the reproducing apparatus to a first video field of a parallel information program in said parallel program recorded region having a preset program number.

4. An information recording disc as claimed in claim 1, wherein m video fields of the information signals are recorded in one track turn of the information recording disc, where m is an integer greater than or equal to two, and said connecting region comprises a predetermined region defined by a scanning locus which is identical to a scanning locus of a time when first through m-th video fields of one of said parallel information programs in said parallel program recorded region are recorded, and by a complete track turn which is, in said predetermined region, the closest to said single program recorded region, said complete track turn being successively recorded with first through m-th video fields of the single information program, the same information signals as the signals recorded on the complete track turns being recorded among corresponding video fields of the adjacent track turns in said predetermined region.

5. A reproducing apparatus comprising a reproducing element for reproducing signals from an information recording disc, said information recording disc comprising a recording surface, a spiral track formed on said recording surface, said spiral track being made up of a plurality of track turns and being recorded with information signals including at least video signals, said information signals making up a plurality of information programs which are categorized into parallel information programs and a single information program, only one of a plurality of parallel information programs being selectively reproduced at one time, portions of said plurality of parallel information programs being sequentially recorded with a period equal to a predetermined number of video fields of the video signals, said predetermined number being less than or equal to a number of video fields recorded in one track turn, a parallel program recorded region formed in at least a part of said recording surface, said parallel program recorded region comprising within a predetermined sector on said recording surface a plurality of adjacent track turns recorded with information signals of the same video field number and making up said plurality of parallel information programs, a single program recorded region formed in a part of said recording surface and recorded with a single information program which is to be reproduced after one of said plurality of parallel information programs in said parallel program recorded region is reproduced, and a connecting region formed in a part of said recording surface between said parallel program recorded region and said single program recorded region for smoothly guiding said reproducing element from said parallel program recorded region to said single program recorded region, each of said parallel program recorded region and said connecting region comprising track turns having vertical blanking parts recorded with vertical blanking periods of the video signals, at least one of said vertical blanking parts in each track turn being recorded with an address signal comprising a first code indicating whether an information program recorded in a track turn of a region is a single information program or a parallel information program, a second code indicating whether the region is the parallel program recorded region or the connecting region, a fourth code indicating the number of information programs recorded in the region, and a fifth code indicating the information program number of the program recorded in the region, said reproducing apparatus comprising:

demodulating means for demodulating signals reproduced by said reproducing element into original information signals;

kicking means for kicking said reproducing element from one track turn to another track turn responsive to kick pulses applied thereto, said reproducing element being kicked over a number of track turns in a direction dependent on a number and the polarity of said kick pulses applied to said kicking means, respectively;

selecting means for selecting externally of said reproducing apparatus a program number of a parallel information program which is to be reproduced from among said plurality of parallel information programs;

an address signal reproducing circuit for detecting and reproducing said address signal from an output reproduced signal of said demodulating means; and control means supplied with output address signal of said address signal reproducing circuit for calculating a number of track turns over which said reproducing element must be kicked in each of said vertical blanking parts in one track turn of the information recording disc in order to reproduce the selected parallel information program in a normal reproducing mode and for supplying to said kicking means the calculated number of kick pulses having a polarity dependent on the direction in which said reproducing element is to be kicked.

* * * * *